United States Patent

Ebersohl

Patent Number: 5,994,999
Date of Patent: Nov. 30, 1999

[54] LOW VOLTAGE LINK FOR TRANSMITTING ON/OFF ORDERS

[75] Inventor: Gérard Ebersohl, La Mulatiere, France

[73] Assignee: GEC Alsthom T & D SA, Paris, France

[21] Appl. No.: 09/116,210

[22] Filed: Jul. 16, 1998

[30] Foreign Application Priority Data

Jul. 17, 1997 [FR] France ................................. 97 09067

[51] Int. Cl.⁶ ............................ H04B 1/00; H04B 10/08
[52] U.S. Cl. ............................... 340/310.01; 340/310.03; 359/142
[58] Field of Search .................. 340/310.01, 310.03, 340/310.06, 825.72, 531, 555; 359/142–144, 111, 109

[56] References Cited

U.S. PATENT DOCUMENTS

| | | | |
|---|---|---|---|
| 4,408,185 | 10/1983 | Rasmussen | 340/310.01 |
| 4,641,378 | 2/1987 | McConnell et al. | 455/612 |
| 5,268,666 | 12/1993 | Michel et al. | 340/310.01 |
| 5,353,009 | 10/1994 | Marsh et al. | 340/505 |
| 5,459,459 | 10/1995 | Lee, Jr. | 340/825.54 |

FOREIGN PATENT DOCUMENTS

3406671 A1  8/1985  Germany .

OTHER PUBLICATIONS

Patent Abstracts of Japan, vol. 009, No. 053 (E–301, Mar. 7, 1985 corresponding to JP 59 193633 A (Fujitsu KK) Nov. 2, 1984.

Patent Abstracts of Japan, vol. 096, No. 002, Feb. 29, 1996 corresponding to JP 07 273692 A (Hitachi Ltd) Oct. 20, 1995.

*Primary Examiner*—Donnie L. Crosland
*Attorney, Agent, or Firm*—Sughrue, Mion, Zinn, Macpeak & Seas, PLLC

[57] ABSTRACT

A low voltage link for converting on/off orders between a relay building and remote high or medium voltage electrical disconnection apparatus, the link being mainly constituted by a bundle of electrical lines extending from the building to the remote apparatus, each line serving to convey an on/off order in the form of a voltage step. The voltage step transmitted on each line is converted, at the end of the line close to the electrical apparatus, into a two-state optical signal by an electro-optical conversion unit associated with said line, said optical signal then being delivered to an opto-electronic conversion unit associated with the electro-optical conversion unit in order to deliver a two-state electrical control signal to the apparatus. A crosstalk reduction device is provided at the terminals of each electro-optical conversion unit to reduce the level of a crosstalk voltage peak received at the terminals of said unit by use of a capacitive circuit forming a voltage divider, and to subtract a certain voltage from the reduced voltage peak by use of a zener diode so that the voltage peak received at the terminals of the electro-optical conversion unit is not detected thereby.

4 Claims, 1 Drawing Sheet

LOW VOLTAGE LINK FOR TRANSMITTING ON/OFF ORDERS

The invention relates to high and medium voltage electrical installations, and more particularly to a low voltage link for transmitting on/off orders between a relay building and one or more remote electrical disconnection apparatuses, such as disconnectors or compressed gas circuit breakers.

BACKGROUND OF THE INVENTION

Such an apparatus is opened or disengaged and closed or engaged by powering one of two control coils associated with the apparatus. Traditionally, each coil is powered by a low voltage electrical signal produced from the relay building by closing an order-transmitting contact, e.g., a local control pushbutton or a contact of a remote protection relay.

On/off orders are conveyed over a low voltage link constituted mainly by a bundle of conductive cables forming as many electrical lines extending between the building and the apparatus, with each line serving to convey a single on/off order in the form of a voltage step of about 250 volts. Such a link is relatively long, about 100 meters to 200 meters. In addition, signals indicating the state of the electrical apparatus (in particular whether it is in the engaged state or the disengaged state) as delivered by auxiliary contacts of the kind described in French patent application No. 92/06920 are returned via these electrical lines to enable the operator to make decisions concerning engagement and disengagement.

Auxiliary contacts are now designed around electronic circuits as described in French patent application No. 94/11638, and coil control relays have been replaced by static switches based on transistors. Under such conditions, it is necessary to isolate the electronic circuits from the high voltages in common mode that can appear on the electrical lines used for transmitting on/off orders. To avoid any risk of the electronic circuits being destroyed, consideration has therefore been given to isolating the electronic circuit of the electrical lines proper by a system comprising two stages of electrical/optical conversion. More particularly, as shown in FIG. 1, at the end of each electrical line such as the line 1, there is connected in series an electro-optical conversion unit 11 which thus converts a voltage step into an optical signal having two logic states, and an opto-electrical conversion unit 12 connected to the unit 11 via an optical fiber 10 which serves to convert the optical signal output by the unit 11 into a two-state electrical signal suitable for use as a control signal by a processor such as 13, the processor being connected to auxiliary contacts such as 14 and to static switches for controlling the coils such as 15 of the apparatus 16. These orders, in particular commands, must be transmitted to the apparatus with as little delay as possible.

In such a setup, a problem of crosstalk has been observed between adjacent electrical lines in the link, which problem can give rise to general malfunction of the control of the electrical apparatus.

More particularly, with reference to FIG. 1, when contact C2 close to the relay building BR is closed, a voltage step S2 is applied to the line 2, and this electrical signal is received by the associated electro-optical conversion unit (not shown) to be converted into an electrical control signal for the processor 13.

However, because the link cables are not shielded from one another and because the link is relatively long, transmission of voltage step S2 of level V on line 2 causes a voltage peak S1 of level V to be conveyed on adjacent line 1 even though contact C1 had remained open. This voltage peak S1 tapers off (as shown in the figure) in application of a relationship that depends on the structure of the unit 11 connected to the end of the line 1 (relationship may be exponential, for example, if the unit 11 can be approximated as a resistance). The peak is detected by the unit 11 and then converted into an optical signal for the unit 12, with this relatively short optical signal nevertheless being detected by the unit 12 because of the intrinsic speed and sensitivity thereof, and finally being converted into an electrical control signal for the processor 13. This means that a wrong order is applied to the processor 13 and that can be detrimental to proper operation of the system.

OBJECT AND SUMMARY OF THE INVENTION

The object of the invention is to remedy this drawback in a manner that is simple and without delaying the acquisition of on/off orders in the conversion units.

To this end, the invention provides a low voltage link for converting on/off orders between a relay building and remote high or medium voltage electrical disconnection apparatus, the link being mainly constituted by a bundle of electrical lines extending from the building to the remote apparatus, each line serving to convey an on/off order in the form of a voltage step, wherein the voltage step transmitted on each line is converted, at the end of the line close to the electrical apparatus, into a two-state optical signal by an electro-optical conversion unit associated with said line, said optical signal then being delivered to an opto-electronic conversion unit associated with the electro-optical conversion unit in order to deliver a two-state electrical control signal to the apparatus, and wherein means are provided at the terminals of each electro-optical conversion unit to reduce the level of a crosstalk voltage peak received at the terminals of said unit by means of a capacitive circuit forming a voltage divider, and to subtract a certain voltage from the reduced voltage peak by means of a zener diode so that the voltage peak received at the terminals of the electro-optical conversion unit is not detected thereby.

Thus, according to the invention, the crosstalk electrical signal that appears on a line is not eliminated, and it is merely its effect which is eliminated, thereby avoiding slowing down the transmission of on/off orders to the electrical apparatuses that are to be controlled.

BRIEF DESCRIPTION OF THE DRAWING

An embodiment of the invention is described below in greater detail as shown in the figures.

MORE DETAILED DESCRIPTION

Figure 1:
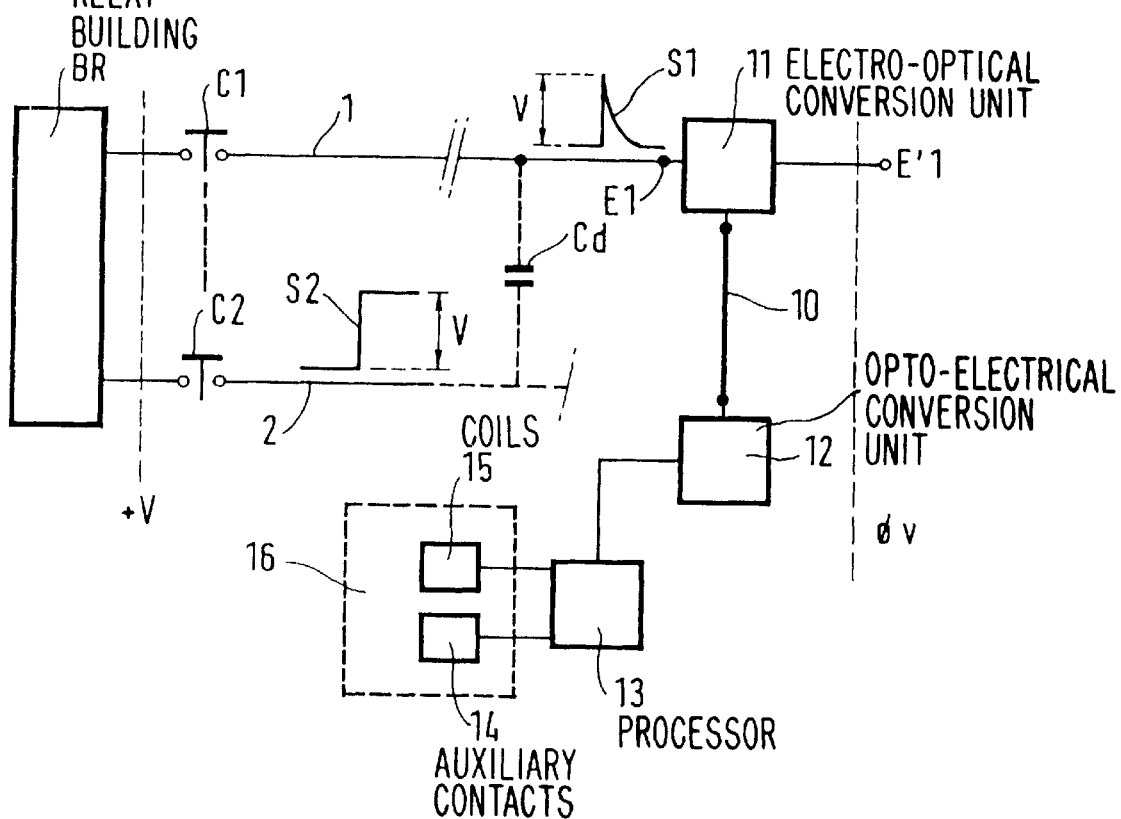
FIG. 1 is a diagram of a low tension link between a relay building and an electrical disconnection apparatus, such as a circuit breaker.

FIG. 1 shows the phenomenon of crosstalk between adjacent lines of the link, e.g., lines 1 and 2, due to a notional coupling capacitance Cd between the lines, said capacitance Cd being of the order of 15 nanoFarads (nF) per 150 meters of wire link.

Figure 2:
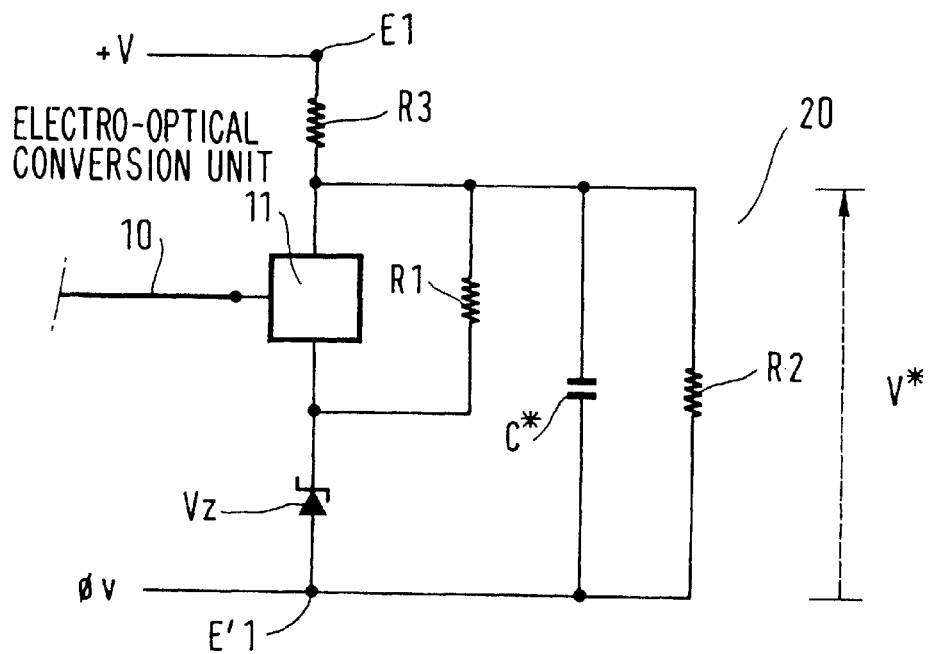
FIG. 2 shows in greater detail the means of the invention for reducing the effects of crosstalk between adjacent electrical lines in such a link.

FIG. 2 shows the means 20 of the invention for reducing the voltage level of the voltage peak S1 as applied to the line 1 and as seen at the terminals E1, E'1 of the unit 11 on the line 1. These means comprise a capacitor C* connected in parallel across the terminals of the unit 11 which, in association with the notional capacitance Cd constitutes a voltage divider. When a voltage peak of V volts is applied to the line 1, the level V* of the voltage received across the terminals of the unit 11 is given by the following relationship:

$$V^* = V \cdot (1/C^*)/(1/C^* + 1/Cd)$$

in other words this level is made smaller in a ratio of about 10 to 1 by selecting an appropriate value for C*.

In addition, a zener diode is connected in the electrical circuit of the capacitor C* to subtract a certain voltage Vz from the smaller voltage V*, said voltage Vz being developed under the effect of a resistor R1 connected in parallel with the unit 11. This means that the unit 11 receives a voltage peak across its terminals that is of a level that is extremely small when Vz and C* are selected appropriately to ensure that the difference V*−Vz lies below the smallest voltage level that is detectable by the unit 11.

When a voltage step such as S1 is transmitted over the line 1 by closing the contact C1, the unit 11 receives across its terminal a signal whose voltage level is equal to V*−Vz. Since Vz is much smaller than V, this loss of voltage has no influence on the operation of the unit 11.

Naturally, the means 20 of the invention for reducing the effect of this crosstalk phenomenon between adjacent lines in a low voltage link is provided on each of the lines of the link.

It will be observed that when the conversion unit 11 is not a linear circuit, then it is desirable for the capacitor C* to be discharged on each occasion so as to conserve a voltage V* appropriate for Vz. This is the function of the resistor R2 connected in parallel with the terminals of the capacitor c*.

In addition, a low resistance resistor R3 is also provided to limit to V/R3 the peak current flowing through the order-sending contact on the line, in this example the contact C1. It should be observed that the time constant C*. R3 does not give rise to any significant delay in the acquisition of on/off orders at the conversion unit 11.

To ensure that on/off orders are acquired properly over a large range of voltages V, it is advantageous to ensure that each conversion unit 11 is provided with a constant current source over a large range of working voltages V*−Vz that depend on V.

I claim:

1. A low voltage link for converting on/off orders between a relay building and a remote high or medium voltage electrical disconnection apparatus, the low voltage link comprising: a bundle of electrical lines extending from the relay building to the remote electrical disconnection apparatus, each line serving to convey an on/off order in the form of a voltage step, wherein the voltage step transmitted on each line is converted, at the end of the line proximate the remote electrical disconnection apparatus, into a two-state optical signal by an electro-optical conversion unit having terminals and which is associated with said line, said optical signal being delivered to an opto-electronic conversion unit associated with the electro-optical conversion unit to deliver a two-state electrical control signal to the remote electrical disconnection apparatus, and wherein a crosstalk reduction device is provided at the terminals of each electro-optical conversion unit, said crosstalk reduction device including:

a capacitive circuit forming a voltage divider which reduces a level of a crosstalk voltage peak received at the terminals of said electro-optical conversion unit thereby to obtain a reduced voltage peak; and a zener diode which subtracts a voltage from the reduced voltage peak, so that the reduced voltage peak received at the terminals of the electro-optical conversion unit is not detected thereby.

2. The link of claim 1, in which the electro-optical conversion unit includes a current source.

3. The link of claim 1, in which said capacitive circuit comprises a capacitor connected in parallel across the terminals of each electro-optical conversion unit.

4. The link of claim 3, in which said capacitive circuit further comprises a resistor connected in parallel with said capacitor.

* * * * *